No. 708,850. Patented Sept. 9, 1902.
T. S. WILKIN.
BAND SAW WHEEL.
(Application filed Mar. 14, 1901.)
(No Model.)

Witnesses.

Inventor.

UNITED STATES PATENT OFFICE.

THEODORE S. WILKIN, OF MILWAUKEE, WISCONSIN.

BAND-SAW WHEEL.

SPECIFICATION forming part of Letters Patent No. 708,850, dated September 9, 1902.

Application filed March 14, 1901. Serial No. 51,174. (No model.)

*To all whom it may concern:*

Be it known that I, THEODORE S. WILKIN, residing in Milwaukee, in the county of Milwaukee and State of Wisconsin, have invented a new and useful Improvement in Band-Saw Wheels, of which the following is a description, reference being had to the accompanying drawings, which are a part of this specification.
Endless band-saws employed in sawmills are now commonly constructed with teeth on both edges, so as to be adapted to cut up logs moving past them first in one direction and then in the other direction. These endless band-saws are carried on large band-wheels, over which the saw runs at the extremities of its route of travel and by which wheels the saw is supported. The body of the saw runs on and is supported by the surface of the band-wheels, and the edges (at least the teeth) of the saw project at each edge beyond the edges of the rims of the wheels. It is desirable that the entire width of the saw between the teeth should be supported by contact with the wheels and that the teeth only should project beyond the rims of the wheels. There is no difficulty in providing wheels having rims of such width as to thus support the body of the saw entirely across the intertooth space when the saw is new; but as the saw is worn by use it is repeatedly sharpened by cutting the teeth farther into the band or body of the saw, thus narrowing the intertooth space, so that very soon the rims of the wheels, if originally made as wide as the intertooth space of the saw, project laterally beyond this intertooth space to such extent that the teeth themselves bear on the rims of the wheels. Because of the set of the saw-teeth this is undesirable. My present invention is directed to the production of band-saw wheels that are adapted to obviate this difficulty.

My invention consists in the band-saw wheel, its parts, and combinations of parts, as herein described and claimed, and the equivalents thereof.

Figure 1:
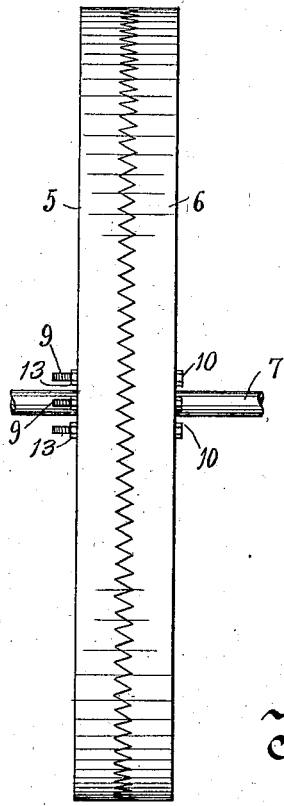
Figure 2:
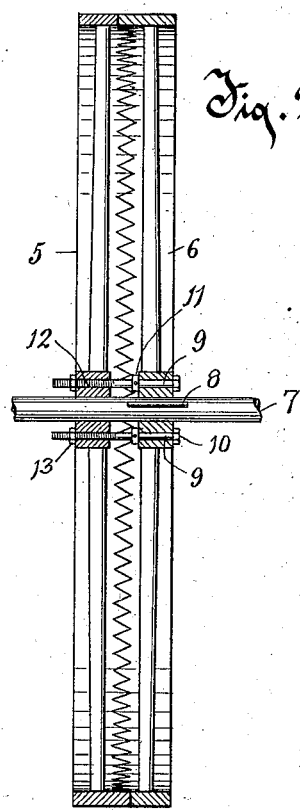
Figure 3:
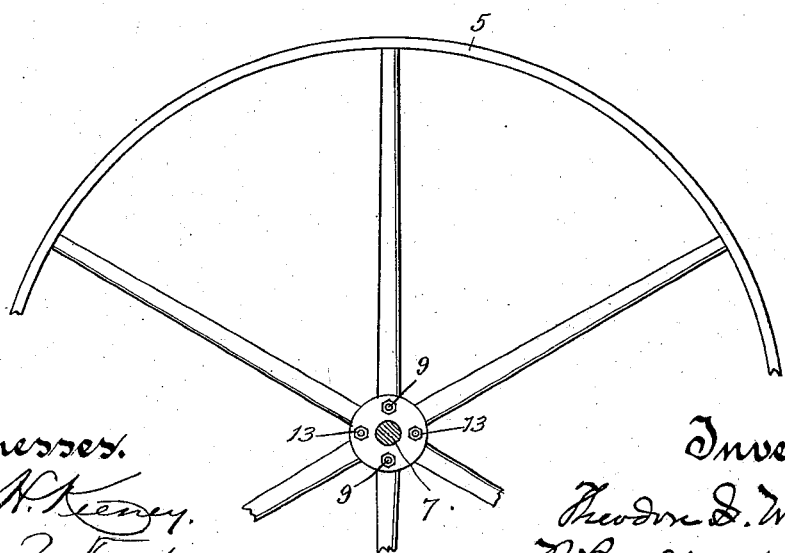

In the drawings, Figure 1 is an edge view of my improved band-wheel. Fig. 2 is a longitudinal section through the band-saw wheel.
Fig. 3 is an end view of a fragment of my improved band-wheel.

My improved band-wheel includes two members 5 and 6, constructed and disposed to be complementary to each other, each member being in form a complete wheel, having an edge of its rim formed with teeth or serrations to complement the teeth or serrations in the adjacent edge of the contiguous member of the wheel. In use these wheels are frequently eight feet or more in diameter, and the rims of the wheels are about twelve inches in width in the direction of the length of the axis of the wheel. In a band-wheel of my improved form the teeth in the edge of each rim of the wheel may be made two inches or thereabout in depth, and when so formed the members of the wheel can be separated from each other one and a half inches or slightly more, and still the teeth will overlap at the ends, thus providing a bearing for the saw across the entire width of the thus-separated members of the wheel, and as the saw is made narrower by the cutting of the teeth deeper into the body of the saw the two members of the band-saw wheel can be moved toward each other until the teeth on the rims of the saw shall have come entirely together in the manner shown in the drawings. By this construction the wheel is adapted to be widened for supporting the saw when new and in its widest condition, and the wheel can be narrowed up from time to time to support the saw properly as the saw is narrowed by cutting deeper into its body for sharpening the teeth.

For securing the two members 5 and 6 of the wheel to each other on the shaft 7 one member of the wheel may be secured rigidly thereto by a key 8 and the other member of the wheel may be secured adjustably to the rigid member by any suitable means. For this purpose I preferably employ bolts 9 9, extending parallel with the shaft through the hub of the fixed member of the wheel and revoluble therein, being retained in place by a head 10 at one side of the hub and by a collar 11 at the other side of the hub, the bolt being advisably provided with a screw-thread 12, that turns into and through the hub of the other member of the wheel. A jam-nut 13 may also be employed, turning on the bolt 9 against the outer surface of the hub of the loose member of the wheel.

What I claim as my invention is—

1. A band-saw wheel, comprising two wheel members each being a complete wheel complementary to each other the members being connected to each other adjustably so as to be adapted to be moved away from or toward each other.

2. A band-saw wheel, comprising two wheel members each being a complete wheel and having rims provided with toothed edges complementary to each other and so disposed that the members can be separated somewhat and the teeth of the two members will still overlap or extend past each other, and means for adjusting the members from and toward each other.

3. In combination, a shaft, a band-saw wheel comprising two wheel members each being a complete wheel, one wheel member being fixed on the shaft and the other wheel member being loose on the shaft, and means for adjusting the loose wheel member toward and from the fixed wheel member.

4. The combination, a band-saw wheel comprising two wheel members each member being a complete wheel and provided with a rim having a serrated edge the serrated edges being complementary to each other, and bolts revoluble in the hub of one member and held thereto against movement endwise and turning by screw-thread in the hub of the other wheel member.

5. A band-saw wheel in two parts of equal diameter, each part being in form a complete wheel, and means for holding the two parts near each other adjustably.

In testimony whereof I affix my signature in presence of two witnesses.

THEODORE S. WILKIN.

Witnesses:
ANNA V. FAUST,
C. H. KEENEY.